Nov. 22, 1949  C. J. CONKLE  2,488,660
TRANSMISSION
Filed March 8, 1947
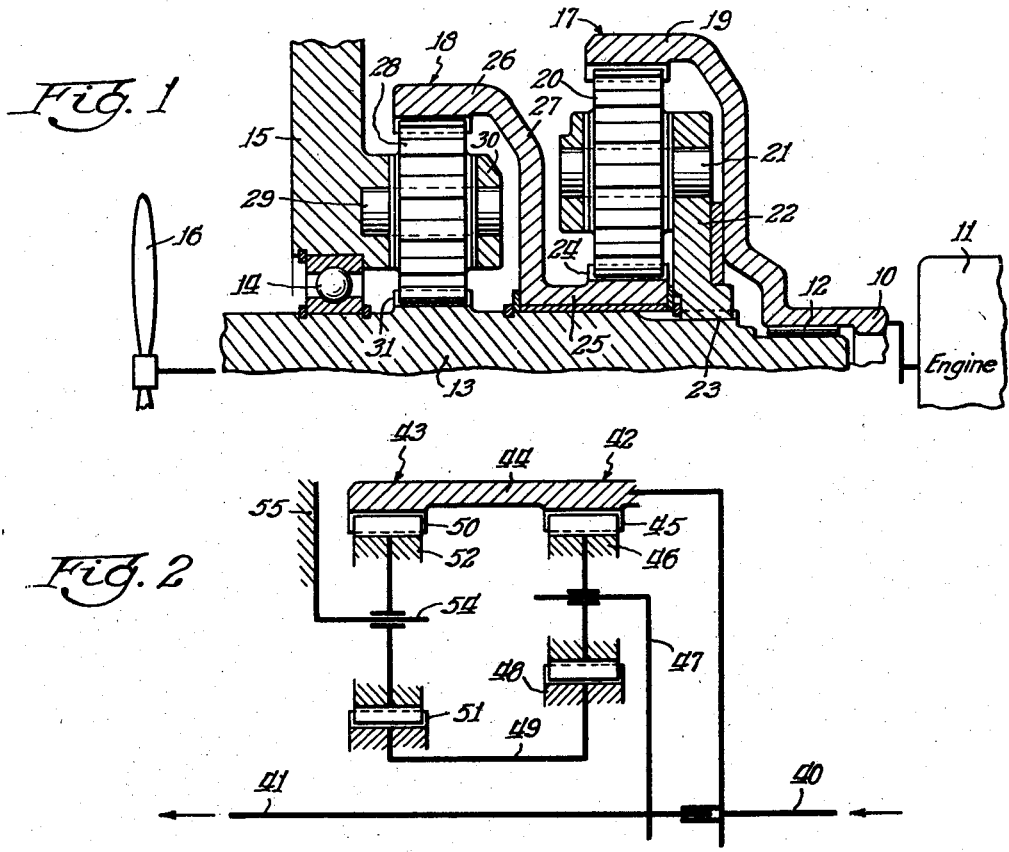
Inventor:
Carl J. Conkle
By Edward Fitzhugh
Atty.

Patented Nov. 22, 1949

2,488,660

UNITED STATES PATENT OFFICE 2,488,660

TRANSMISSION

Carl J. Conkle, Muncie, Ind., assignor to Borg-Warner Corporation, Chicago, Ill., a corporation of Illinois Application March 8, 1947, Serial No. 733,331

2 Claims. (Cl. 74—705)

My invention relates to transmissions and more particularly to transmissions which are suitable for use in airplanes between the engines and propellers thereof.

It is an object of my invention to provide improved transmissions of the planetary gearing type particularly suitable for airplanes and which is of such construction that the input and output shafts, respectively, connected to the airplane engine and airplane propeller, are constantly connected whereby a propeller on the output shaft of the transmission may always function as a flywheel for an engine connected with the input shaft.

It is a further object of the invention to provide improved transmissions of this type comprising double gear systems including a planetary gear set and a reduction gear set adapted to connect the engines and propellers and provide reduction speed units, each functioning to drive the propeller at a substantially lower ratio than engine speed and which may be disposed in a housing which is smaller in diameter in comparison to one that would house a single planetary gear set providing the same reduction ratio.

It is another object of my invention to provide transmissions having improved double gearing systems for the purpose described which are compact and simple in construction and which may be economically manufactured.

The inventions consist of novel constructions, arrangements and devices to be hereinafter described and claimed for carrying out the above stated objects and such other objects as will appear from the following description of certain preferred embodiments illustrated in the accompanying drawing wherein:

Fig. 1 is a longitudinal sectional view of a transmission illustrating one embodiment of the invention; and Fig. 2 is a longitudinal sectional view drawn diagrammatically of a transmission illustrating another embodiment of the invention.

Referring first to the embodiment of my invention shown in Fig. 1, the transmission there shown comprises an input or driving torque-transmitting member or shaft 10 connected to and driven by an airplane engine diagrammatically illustrated at 11. The shaft 10 is piloted by means of roller bearings 12 on the output or driven torque-transmitting member or shaft 13, which is journaled by means of ball bearings 14 in a stationary part 15 which may be a portion of the housing for the transmission. The shaft 13 is connected to and drives an airplane propeller shown at 16.

A change speed mechanism or speed reduction unit comprising a pair of gear sets generally indicated at 17 and 18 is operatively connected between the output and input shafts 10 and 13 to drive the output shaft 13 and thereby the propeller 16 at a lower speed than the input shaft 10, the latter being rotated by the engine 11.

The planetary gear set 17 comprises a ring gear 19 connected to rotate with the input shaft 10; a planet gear or pinion 20 in mesh with the ring gear 19 and rotatably mounted on a stub shaft 21 which is carried by a member 22 splined at 23 to the output shaft 13; and a sun gear 24 formed on a hub member 25 rotatably mounted on the shaft 13 is in mesh with the pinion 20.

The gear set 18 comprises an outer ring gear 26 formed at the extremity of a radially-extending flange 27 integral with the hub 25 so that the ring gear 26 and sun gear 24 are connected together for rotation on the output shaft 13. A gear or pinion 28 is rotatably mounted on a stub shaft 29 which is supported by a gear carrier 30 formed by a lateral extension of the stationary part 15 of the transmission housing. The gear 28 meshes with the ring gear 26 and also with an inner gear 31 formed on the output shaft 13.

In the operation of the transmission, the input shaft 10 rotates the ring gear 19 of the planetary gear set 17 which in turn effects rotation of the planet gear 20 and the carrier 22 in the same direction. The sun gear 24 is the reaction member of the planet gear set 17 and, if the sun gear 24 were stationary, a speed reduction between the shafts 10 and 13 would be effected as determined by the diameter or the relative number of teeth on the gears 24, 20 and 19.

The sun gear 24, however, is given a controlled rotation in a direction reverse to that of the drive shaft 10 which reduces the overall speed reduction between the shafts 10 and 13 to a value less than that which would be provided if the sun gear 24 were stationary. The controlled rotation in a reverse direction of the sun gear 24 is provided by the gear set 18. The carrier 30 of the gear set 18 which carries the gear 28 is stationary as has been described, and, when the shaft 13 rotates in the forward direction, it causes a rotation in the reverse direction of the ring gear 26, and the speed ratio between the shaft 13 and ring gear 26 is determined by the number of teeth on the gear 31 as compared to the number of teeth on the ring gear 26. The ring gear 26 being connected with the sun gear 24 imparts the same reverse rotation thereto, and thus a reduction ratio between the shafts 10 and 13 is obtained by means of the two gear sets 17 and 18 which is greater than the reduction which would simply be obtained by the planetary gear set 17, assuming the sun gear 24 stationary.

Referring to the other embodiment of the invention diagrammatically shown in Fig. 2, the transmission there illustrated comprises an input shaft 40 receiving and piloting in one end thereof an output shaft 41 in a manner similar to that shown and described with respect to the corresponding members of the transmission of Fig. 1, the input shaft being adapted to be connected to an airplane engine (not shown) and the output shaft to an airplane propeller (not shown).

The change speed mechanism or reduction speed unit comprises a planetary gear set and a reduction gear set generally indicated at 42 and 43 respectively connecting operatively the input and output shafts 40 and 41 and adapted to drive the shaft 41 at a speed less than that of the shaft 40.

The planetary gear set 42 comprises a cylinder 44 connected to rotate with the input shaft 40 and having internal teeth providing a ring gear 45; a planet gear 46 in mesh with the ring gear 45 and rotatably supported by a carrier 47 connected to rotate with the output shaft 41, the planet gear 46 meshing with a sun gear 48 formed on a sleeve 49 rotatably mounted on the output shaft.

The reduction gear set 43 also includes the cylinder 44 having internal teeth providing an outer ring gear 50 which is thereby connected to the ring gear 45 to rotate therewith and with the input shaft 40; an inner gear 51 formed on the sleeve 49 and which gear is thereby connected for rotation with the sun gear 48; and an idler gear 52 in mesh with the gear 51 and ring gear 50. The idler gear 52 is mounted on a stub shaft rotatably supported by a gear carrier 54 forming a portion of the stationary part 55 of the transmission housing.

In the operation of the transmission for effecting a reduction of the speed of the input shaft with respect to the speed of the output shaft, rotation of the input shaft and thereby the cylinder 44 connected thereto and its ring gears 45 and 50 will rotate the gears 46 and 52 in mesh therewith. Upon rotation of the gears 46 and 52, the sleeve 49 and thereby its gears 48 and 51 will also be rotated.

In the operation of the transmission for effecting the reduction of the speed of the output shaft with respect to the input shaft, rotation of the input shaft 40 and thereby the cylinder 44 connected thereto and its ring gears 45 and 50 will rotate the gears 46 and 52, the sleeve 49 and its gears 48 and 51.

If the sun gear 48 of the planetary gear set were assumed stationary and disconnected from the gear 51 and the ring gear 45 be disconnected from the ring gear 50 so that the gear set 43 is not at all effective in the power train, the output shaft 41 would be driven at a certain reduced speed ratio dependent on the diameters of the gears 48, 46 and 45. The gear set 43 in the transmission, as it is shown, provides a controlled rotation in the reverse direction of the sun gear 48 so that the reduced speed ratio between the shafts 40 and 41 is greater than would be the case if the planetary gear set 42 alone were operative. Rotation of the ring gear 50 in the forward direction gives a controlled rotation in the reverse direction to the gear 51 which is dependent on the sizes of the gears 50 and 51. This rotation of the gear 51 is transmitted through the sleeve 49 to the sun gear 48.

It will be noted that the gears 46 and 52 are of different sizes, the gears 52 being larger than the planet gears 46. It is this difference of size that determines the reverse speed of the sun gear 48 and therefore the overall speed reduction ratio between the shafts 40 and 41.

It is to be noted that the gear set 42 in effect constitutes a planetary unit having two inputs and a single output, one input comprising the ring gear 45 which is directly driven from the input shaft 40, and the other input comprising the sun gear 48 which derives its motion from the output gear 51 of the reduction gear set 43. The output of the planetary gear set 42 comprises the carrier 47 of the planet gear 46, which carrier serves directly to drive the output shaft 41. The gear set 43 in effect constitutes a simple speed-change and direction-reversal mechanism having a single input and a single output. The input of the gear set 43 comprises the gear 50 which, since it is integral or moves in unison with the input gear 45 of the planetary gear set 42, derives its motion directly from the input shaft 40. The output of the gear set 43 is the gear 51 which is integral with or operatively connected to the sun gear 48 of the planetary gear set 42. The output of the gear set 43 therefore constitutes one of the inputs of the planetary gear set 42 and, since the gear set 43 is a direction reversal mechanism, the input resulting therefrom and leading into the gear set 42 is of a negative character whose input increments of speed must be subtracted from the positive input increments of speed which are fed into the differential gear set 42 by the ring gear 45 which derives its motion from the input shaft 40. It is this difference between the positive input fed into the planetary gear set 42 by the shaft 40 and the negative input fed into the planetary gear set 42 likewise by the shaft 40 operating through the direction reversal gear set 43 that constitutes the desired speed reduction between the input and the output shafts 40 and 41 respectively.

It should also be noted at this point that because the gear 48 is of larger diameter than the gear 51 with which it is integral, the negative input above referred to of the planetary gear set 42 is amplified over and above the negative output afforded by the gear 51 of the gear set 43. Obviously the relative diameters of the two gears 48 and 51 may be varied at will to obtain the ultimate desired speed reduction between the input and output shafts 40 and 41 respectively.

It will be apparent from the foregoing description that I have provided improved transmissions each embodying sets of gearing coupled together and connected between the input engine shaft and the output propeller shaft in a manner adapted to drive the propeller shaft at a speed substantially less than that of the engine output shaft and that each transmission may be enclosed in a housing which is smaller in diameter as compared to one that would house a single planetary gear set providing the same reduction ratio. Also, my improved transmissions are simple and compact in construction, have relatively few parts and can be economically manufactured.

It will also be apparent that the transmissions herein described may be used in automotive vehicles or in other machines as speed reducing units between an input or driving shaft and a driven or output shaft and also that the transmissions may be utilized as speed increasing units, if desired, by a reversal of the transmissions with respect to the engine and propeller of an airplane or other driving and driven means of a machine, all of which changes are believed to be within the scope of the invention as it is defined by the appended claims.

I claim:

1. In a transmission, the combination of input and output shafts, and means for providing a drive between said shafts and including a member having spaced sets of internal gear teeth thereon and connected to one of said shafts, a member having sets of spaced external gear teeth thereon and rotatable relative to said shafts, gears meshing with said internal and external gear teeth, one of said last-mentioned gears being connected to revolve about the axis of the other of said shafts and at the same rate of speed as said latter shaft, and a fixed carrier for the other of said gears.

2. In a transmission, the combination of an input shaft and an output shaft, said shafts being arranged in substantial alignment, a speed-change power train operatively connecting said shafts and including a planetary gear set and a direction-change and speed-reduction gear set; said direction-change and reduction gear set having a single input in the form of an internal ring gear mounted for rotation in unison with said input shaft, a single output in the form of an external gear mounted for rotation about the axis of said output shaft, and an idler gear in mesh with said input and output gears and mounted for rotation about a fixed axis, said idler gear and output gear being nested within said ring gear; said planetary gear set having an input in the form of an internal ring gear operatively connected with said first mentioned ring gear in driving relationship, a second input in the form of an external sun gear mounted for rotation about the axis of said output shaft, a planet gear in mesh with said input gears, and an output in the form of a carrier for said planet gear and operatively connected to said output shaft in driving relationship; said planet and the second input gear of said planetary gear set being nested within said latter ring gear; the output gear of said direction-change and speed-reduction gear set being operatively connected with the second input gear of said planetary gear set in driving relationship whereby the speed of rotation of said output shaft is a function of the speed of rotation of said input shaft.

CARL J. CONKLE.

REFERENCES CITED

The following references are of record in the file of this patent:

UNITED STATES PATENTS

| Number | Name | Date |
| --- | --- | --- |
| 1,221,626 | Tadey | Apr. 3, 1917 |

FOREIGN PATENTS

| Number | Country | Date |
| --- | --- | --- |
| 447,786 | Great Britain | May 26, 1936 |
| 771,686 | France | July 30, 1934 |